(12) United States Patent
Rhodes

(10) Patent No.: US 7,054,948 B2
(45) Date of Patent: May 30, 2006

(54) COLLABORATIVE HOST MASQUERADING SYSTEM

(75) Inventor: David L. Rhodes, Brick, NJ (US)

(73) Assignee: OpCoast LLC, Brick, NJ (US)

( * ) Notice: Subject to any disclaimer, the term of this patent is extended or adjusted under 35 U.S.C. 154(b) by 721 days.

(21) Appl. No.: 09/726,087

(22) Filed: Nov. 29, 2000

(65) Prior Publication Data

US 2002/0065930 A1    May 30, 2002

Related U.S. Application Data

(60) Provisional application No. 60/187,487, filed on Mar. 7, 2000.

(51) Int. Cl.
*G06F 15/173* (2006.01)

(52) U.S. Cl. .................. 709/238; 709/239; 370/351; 370/401

(58) Field of Classification Search ........ 709/238–239, 709/223–224, 226; 370/351, 389, 392, 400, 370/401
See application file for complete search history.

(56) References Cited

U.S. PATENT DOCUMENTS

| | | | | |
|---|---|---|---|---|
| 5,774,660 A | * | 6/1998 | Brendel et al. | 709/201 |
| 5,781,550 A | * | 7/1998 | Templin et al. | 370/401 |
| 5,828,569 A | * | 10/1998 | Fisher | 700/82 |
| 5,917,997 A | * | 6/1999 | Bell et al. | 714/4 |
| 5,928,331 A | * | 7/1999 | Bushmitch | 709/231 |
| 5,938,732 A | * | 8/1999 | Lim et al. | 709/229 |
| 5,951,650 A | * | 9/1999 | Bell et al. | 709/238 |
| 5,956,716 A | * | 9/1999 | Kenner et al. | 707/10 |
| 5,996,015 A | * | 11/1999 | Day et al. | 709/226 |
| 6,003,030 A | * | 12/1999 | Kenner et al. | 707/10 |
| 6,041,354 A | * | 3/2000 | Biliris et al. | 709/226 |
| 6,137,792 A | * | 10/2000 | Jonas et al. | 370/354 |
| 6,650,641 B1 | * | 11/2003 | Albert et al. | 370/392 |

OTHER PUBLICATIONS

Choosing Sure Stream or Single Rate Encoding (Real Networks 2001).*

* cited by examiner

*Primary Examiner*—William C. Vaughn, Jr.
*Assistant Examiner*—LaShonda Jacobs
(74) *Attorney, Agent, or Firm*—Davidson, Davidson & Kappel, LLC

(57) ABSTRACT

A system and method for congestion avoidance and load balancing for communication networks is provided. When a source host is sending information to a destination host and a need is detected for an alternate route, a masquerading host acts as the source host and sends the information to the destination along the alternate route. The data is sent in a manner that leads the destination to believe that the data came from the source. In this way, the destination will accept the data as valid. General network status data such as delay times, packet delivery failures, bandwidth information, link status, etc., is used to control and manage the masquerading servers, which are arranged in a rim. Message data may be replicated on each host in the rim or may be passed among the host, or may stem from outside the rim.

70 Claims, 1 Drawing Sheet

COLLABORATIVE HOST MASQUERADING SYSTEM

CROSS REFERENCE TO RELATED APPLICATION

This application claims priority from provisional patent application Ser. No. 60/187,487 filed Mar. 7, 2000, the entire disclosure of which is hereby incorporated by reference.

BACKGROUND OF THE INVENTION

When transmitting data over a communications network, information is oftentimes transmitted in packets containing the data and a 'header'. The header contains information that defines various aspects of the packet. These aspects may be the source (sender) and destination (receiver) addresses, message identification information, the amount of data that is contained in the packet, etc. A message that cannot be accommodated in a single packet is split into a series of packets for network transmittal. Thus, the overall communication occurs as a series of packet transmittals between the source (sending) and destination (receiving) hosts (typically a computer system of some type). Within the network, packets are switched or routed at points usually called a 'hop'; hops are connected by 'links'. The destination host reassembles the packets from the original message. In general, each packet is not constrained to travel along the same path as others, and, at each hop or link, one or more packets may become lost or destroyed. Thus, only a partial set of the originally transmitted packets may arrive at its destination and, furthermore, they may arrive in an out-of-order fashion (e.g. in an order different from that sent). Duplicated packets may also arrive at the destination if the source re-transmits a packet, or if the network takes some other corrective action.

Although current technologies permit dynamic routing of individual packets, such abilities may be inadequate for demanding applications. For example, real-time streaming or lengthy sessions may still be subject to several undesirable events attributable to network connectivity problems including: temporary (and permanent) interruption; partial loss of data; and widely sporadic packet arrivals at the destination. These effects may cause communicating hosts to prematurely disconnect or abort their communication (e.g. when watchdog timers expire); or cause unacceptable service for 'real-time' packet delivery-where such packets require timely delivery to be of any use.

Several approaches have been suggested to remedy these problems, including: handling of the problem at protocol levels above the packet or network levels (e.g. at the application level), the use of hosts acting as proxies or caches (intermediate storage), improvements to traffic shaping, source pacing or advanced flow-control techniques (e.g. "SureStream," RealNetworks, Inc., white paper, Seattle, Wash.), preferential selection of the data source host statically before the transmission begins (see Brian Kenner, et al, "System and method for optimized storage and retrieval of data on a distributed computer network," U.S. Pat. No. 6,003,030 issued 14, Dec. 1999), new network router techniques and algorithms, as well as other techniques. These existing techniques can be categorized as advanced caching, proxy or flow-control methods, or as static server load balancing methods, and are either tailored to recovery of lost data after detection (often times by the client), or are application level techniques. As such, they cannot overcome basic packet level communication disruptions between hosts as they arise from time to time (dynamically) in large networks. Network proxies act as intermediate storage points for a set of receiving hosts, but do not alter the network routing of packets from original source to proxy nor from proxy to destination.

Current packet-based routers provide a limited form of dynamic routing capabilities since they may decide which route/path (and thence subsequent hop) to send an incoming packet based on link status or load. However, such a decision is local to the router and hence meeting broad end-to-end service criteria or providing server management is unobtainable with this approach.

SUMMARY OF THE INVENTION

A network of hosts constructed and arranged for the transfer of digital information is provided. The network comprises a source host, a destination host, at least one collaborating host and a management object constructed and arranged to facilitate collaboration between the source host and the collaborating host in transferring data between the source host and the destination host. The management object may be implemented by software, hardware, or a combination of both. When there is a need for an alternate route between the destination host and the source host, the management object sends the data along the alternate route to the collaborating host, which, in turn, sends the data to either the destination host or another collaborating host which does the same. In sending the data to the destination host, the collaborating host attaches source identifying (identity) information of the source host to the data so that the destination host believes the data is from the source host and accepts the data.

A method for routing information over a network is also provided comprising the steps of obtaining network information; sending data intended for a destination host, from a source host to a collaborating host as a function of the network information; facilitating collaboration between the source host and the collaborating host; sending the data to the destination host from the collaborating host so that the destination host believes the data came from the source host.

The need to use an alternate route may be due to network congestion, to balance system load or both. In systems where the source identification of incoming packets is used in the association of the packet with a particular message in receipt, it is necessary to spoof (or fool) the destination when the actual packet source stems from a different source. That is, an alternate source must masquerade as the original source in order for its packets to be found acceptable by the destination for some particular message. In addition, all other aspects of the packet and its header must conform to the expectations of the destination. Thus the original and masquerading sources must collaborate. Preferably, the management object facilitates the collaboration.

In one embodiment of the present invention, the source host forwards the data, with its source identity information to all collaborating hosts in the network. In an alternative embodiment, the collaborating hosts access the source host to obtain the network data and identity information of the source. In another alternative embodiment, multiple copies of the network data are available so that each collaborating host has a local or otherwise available copy of the data for the destination host.

When implemented over the Internet, facilitating collaboration between the source host and the collaborating host further comprises obtaining source identification information from the source host by obtaining an IP identifier of the source and destination, protocol type, source and destination ports, the data, its relative position in the message (e.g. a sequence number) and acknowledgement information. Such information can be incorporated into the packets for re-transmittal by the collaborating host.

DETAILED DESCRIPTION

Figure 1:
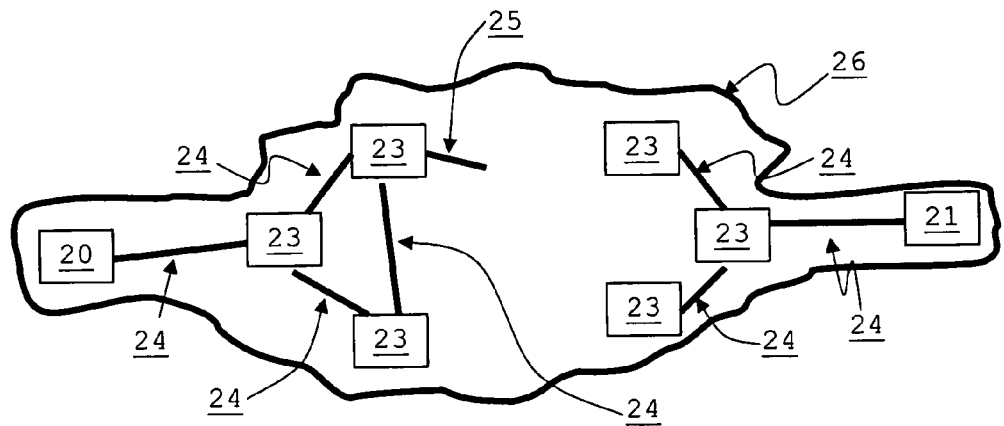
FIG. 1 depicts a prior art network.

The present invention relates to a technique to permit improved connectivity over packet- or cell-based network-of-network systems (e.g. the Internet). The invention is especially applicable to information transmissions which are lengthy or in which timely delivery is critical, although the technique in general applies to messages of any length longer than that which can be contained in a single packet, including for example, file-transport protocol (FTP) sessions for 'large' files (large relative to the time interval(s) between network disruptions) and continuous or real-time streams containing financial, audio or video or any other content. The term 'packet' as used herein includes systems that are typically called packet-based or frame/cell-based (cells are usually fixed length packets).

In prior art systems, a communication message is sent between hosts (e.g. computer systems). Such a message may be of varying length and may be segmented into packets for communication in the network. Upon arrival of said packets, the destination (receiving) host assembles the packets (using information contained in the packets) to reform the original message. These packets may travel along different paths, incurring different latencies, in the network traversal. Moreover, due to congestion or other issues, the network may drop packets (fail to forward thereby losing them). Thus, packets may arrive at the destination out of order, as duplicate copies, and/or require re-transmittal before a complete, error-free copy of the message becomes available at the destination. The destination may use these packets in a 'real-time' fashion, making use of them shortly after arrival (for example in video or audio streaming applications), or store them until the entire message arrives.

The segmentation of information for transmission over a network provides an opportunity to avoid congestion or otherwise improve transfer latency or effective bandwidth via the use of masquerading. This especially applies to either a relatively large message (e.g. a large FTP file transfer) or a message in which timely arrival of packets or group of packets is critical (e.g. with real-time considerations or streaming data).

A communication system according to the present invention comprise a set of hosts, called the 'rim', which are willing to masquerade for each other and participate in collaborative masquerading. By "collaborative masquerading," it is meant that the hosts collaborate to fool a destination into thinking that a message is coming from the original source host when the message is actually coming from a different host, a masquerading host. Collaboration requires that the masquerading host have access to the information to be transferred and the source-identifying information of the source host. In this way, the masquerading host sends information from the source to the destination with the necessary identity information of the source, thereby fooling the destination host into thinking the information came from the source host.

In a further aspect of the present invention, the masquerader packages the data into packet form either in its entirety or as a variation thereof, and transmit the packets to other masqueraders who de-package the packet for subsequent transmittal to the destination.

The rim may be fixed or dynamically change over the course of time, even during the course of a single message delivery. Additionally, two arbitrary hosts are identified as the 'source' and 'destination' whereby the source is transmitting a 'message' to the destination. Without loss of generality, the source may be referred to as a 'server' and the destination as 'sink' or 'client.' This terminology and definition does not restrict the invention to point-to-point communication as it is also applicable for messages using broadcasting, anycasting or multicasting. The technique is primarily targeted to wide-area inter-networking implementation, but is applicable to metropolitan (medium or intra-campus) and even local area networks as well.

The destination identifies incoming packets in part using a source identification attribute (contained in the packet), possibly along with other information, to associate particular packets with a particular message. This is necessary because multiple messages may be received simultaneously. From the point of view of the destination, an incoming packet is an acceptable part of (portion of) some message if it properly conforms to being part of a message in receipt. Thus, the destination is able to receive packets from a third party, the 'masquerader', as long as the information contained in the packet is set to make the destination believe the packets are coming from an acceptable source host. Such a masquerader may change from time to time, and in fact, there may be multiple masqueraders for one message instance. In this way, message packets arrive at the destination from various hosts in the network such that the incoming paths might look like a 'funnel' heading towards the destination and hence the moniker 'rim' for the source(s).

Some type of decision process aimed at control and management of collaborating masquerading data sources is needed to actively direct the rim hosts.

In general, a decision is made on a dynamic basis to employ masquerading for a set of rim hosts. Preferably the decision and management process to facilitate the collaborative masquerading previously discussed is provided by a management object implemented by software, hardware, or a combination of both. Any type of decision mechanism, however, may be employed with the invention. The object can reside anywhere on the network or on an outside controller that is connected to the network. In addition, the object can reside on a number of nodes and act cooperatively to decide what kind of action to take. Ultimately, the object makes a decision concerning the use of masquerading at the lower protocol level and higher protocol levels as is available.

The network status information used to manage the rim hosts can come from many sources. For example, in the case of the Internet, as congestion appears on a host A to host B connection, host A may receive ICMP error packets back from the point of congestion. These ICMP messages may be one of a variety of sub-forms of the "host unreachable," or "time exceeded," types. However, other network status indicators, possibly obtained largely independent of the network itself, may also be used. In addition, since the routing path from host A to host B need not be the same as that from host B to host A, host A may receive status (such as receive buffer space) regarding the destination (e.g. 'source quench') even when host A cannot communicate with host B. All such information can be used as the basis for masquerading decisions as made by the management object. This status information, along with any other type of network status information, can be used in the decision process to direct host A to initiate a 'masquerading' action, namely a switch over to another host in the rim.

A first embodiment of the present invention applies to multi-level protocol systems, like the Internet. Only the protocol level and implementation primarily responsible for packet delivery are changed. Since the functionality and interface at higher protocol levels remains the same, the masquerading and spoofing technique described herein can be used without requiring changes to these higher level protocols. However, the technique of the present invention is not limited to situations where higher level protocols remain unchanged.

The basic method of spoofing and masquerading in accordance with the present invention can be used for point-to-point communication (e.g. one source and one destination), for multicast communications (one source and multiple specific destinations), broadcast (one source to all destinations), anycast (one source to non-particular destinations), or a 'funnel-cast' (multiple sources to one or more destinations). A funnel-cast may be defined as the situation where multiple sources in the rim are simultaneously sending the same or overlapping portions of a message to one or more destinations. Since the destination(s) are tolerant of receiving repeated packets in many networking implementations, this technique can be used to further ensure reliable and timely packet delivery.

The technique can be applied repeatedly for even a single packet delivery. In such a case, the packet traverses more than one masquerader in the route to the destination. This method therefore enables the functionality for source-based or explicitly controlled network routing to the extent that a defined sequence of collaborating masqueraders can be used as routing hops. When applied to the Internet, the masquerader could be viewed as an 'IP reflector' in that packets can be steered through them explicitly. This is accomplished in a different way then suggested by the IP protocol standard via the IP source routing option; moreover additional benefits are provided by the method.

Another use and advantage of the present invention is to balance server loads. Especially in the cases where: (i) the data or message source is locally copied or otherwise easily available to each host participating in the masquerading set; or (ii) the data comes from resources outside of this set. Since a set of masquerading hosts can dynamically adjust which host provides transmittal service(s), the server load can be balanced (in terms of the total number of active connections, CPU or memory usage, their individual or aggregate bandwidth characteristics, etc.).

Referring to FIG. 1, there is shown a prior art network 26 with host nodes or routers 23 connected by links 24. There may or may not be a need to distinguish between hosts and routers since they may or may not provide the same functionality in network operation. Links 24 permit communication between the hosts or routers 23 to which they are connected. The illustration is meant to be a simple sample network, which in practice may be an arbitrarily more complex composition of links, routers and hosts. This aspect is partly captured by depicting some links 25 drawn with one side unconnected. Two particular hosts are identified in the network as a message source 20 and message destination 21 for the purpose of illustration. Messages (or data streams) will be segmented into packets for transmission within the network 26. The packets travel through the network 26 in accordance with the network 26 provided routing method. Each packet may experience a different multihop path and packets may arrive out of order at the message destination 21 or become lost during transmittal.

Figure 2:
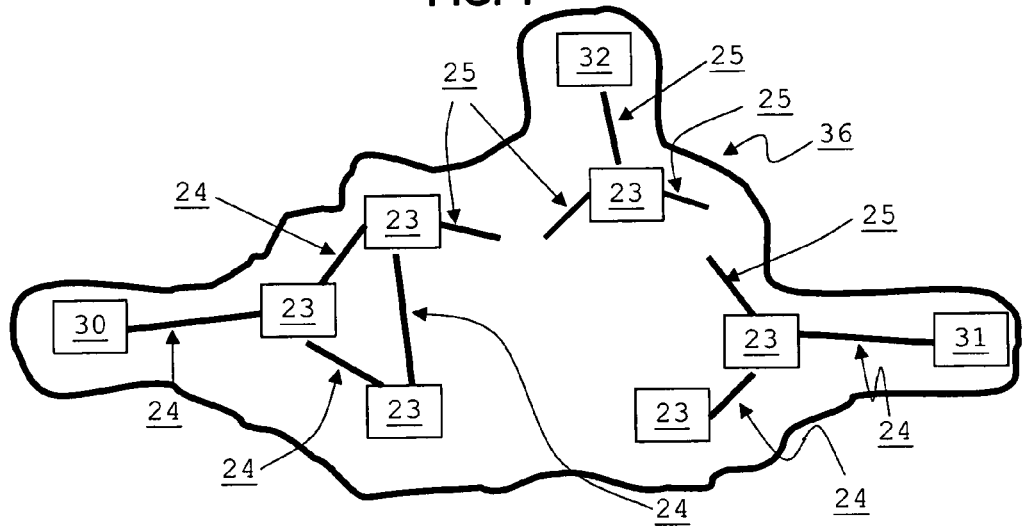
FIG. 2 depicts a communications network according to the present invention.

Now referring to FIG. 2, there is shown a network 36 according to the present invention. A secondary host 32 masquerades as the sending host 30 in the sending of the message to the destination 31. More than one host may act as a masquerading host, but one is shown for simplicity in the illustration. In this case, the masquerading host may coordinate its actions with the original source in the goal for improving message reception at the destination or balancing the load experienced by the rim or a combination of both. In this example, 30 and 32 comprise the rim for the particular case shown, but in general the rim is comprised of an arbitrary number of hosts which may change over time. It should be noted that the network provided path from host 30 to host 31 may be different than the network provided path from host 30 to host 32 and thence to host 31.

Figure 3:
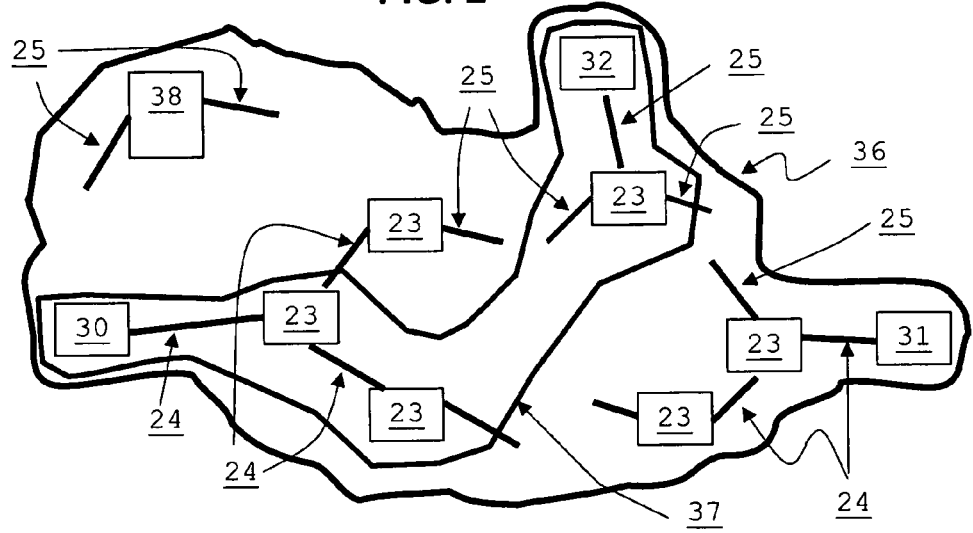
FIG. 3 depicts another embodiment of the communications network of FIG. 2.

FIG. 3 depicts an alternative embodiment of the network 36 of FIG. 2 with specialized network resource 37 for communication between the sending 30 and masquerading 32 host. Since coordination of, and/or transfer of, the original message between these two hosts is necessary, such a dedicated facility may enhance the overall system. In current Internet terminology, this capability would generally be called a Virtual Private Network (VPN).

The invention may be embodied in a variety of network and inter-network systems. While various particular embodiments and particular functional details are discussed herein, the scope of the invention is not limited thereto. The invention makes use of masquerading to avoid inter-network (e.g. Internet) congestion or unavailable network resources to transport data. Network resources may be comprised of links, routers, hubs, switches, shared media based communication (e.g. Ethernet) or any other network component.

In a typical inter-networking arrangement, inter-host traffic (data or messages) flows from hop to hop across links (i.e., the communication is multihopped). The path of this data flow is determined by the network routing scheme, which is generally some method for determining the treatment for and/or next hop of an arrival packet. For various reasons, particular links and hops may become, on an intermittent, sporadic or even long-term basis, unavailable or only partially functional. Since the inter-network is a shared facility, used for communication by a multitude of applications and connected hosts, a similar result of apparent unavailability may be caused when resources are used for other activities or due to other interference. The end effect is that an inter-network presents an unreliable, dynamically changing configuration of available resources, bandwidths and topologies at any time. While the majority of the discussion contained herein relates to multihopped networks, the invention is usable in networks of other than link-hop topologies as well and is not limited to multihopped network formats. For example, portions of the network may use broadcast or shared media including wireless, radio or satellite links, rather than strictly a network of links that interconnect hops and sub-networks.

Referring back to FIG. 2, the primary data direction flow is from the source host 30 to the destination host 31, which would indicate a primarily half-duplex (uni-directional) connection style. It should be noted that the invention could also operate in a full-duplex environment as well. In a full-duplex environment, each of the two communicating hosts act as both sender and receiver. Both or only one may employ the present invention to avoid network congestion. For example, in the event congestion occurs on the network-provided route for the hosts, one host may employ the present invention to avoid congestion while the other uses the network provided route. In the case of complete congestion, the collaborating host may not receive acknowledgements or other data, however, in low or moderate congestion conditions sufficient connectivity may remain to provide acknowledgements as well as small amounts of data. Such issues do not arise for sending hosts that employ this method using a half-duplex connection style.

In the invention, packets arriving at the destination are associated with, and re-assembled into a particular message using information contained in the packet. The destination may be simultaneously receiving several messages from one or more sources, so it uses an identification variable assigned to the source, which is carried in each packet, as part of the information for reassembling the original message. Additional control information, along with data content, may also be present in the packet.

A third-party host (or possibly more than one as changing on a dynamic basis) sends packets that contain portions of the overall message into the network masquerading as the data source. A masquerading host 32 may send packets into the network masquerading as the source 30. When source identification contained in the packet is used as part of the reassembly information, the masquerading host 32 must place the source 30 identifier, rather than its own identifier, in packets sent to the destination 31 (for this particular case). This gives rise to the terminology that the masquerading host 32 is masquerading for the source 30 and that the destination is spoofed by the masquerader 32 into believing that packets sent from itself actually come from the source 30.

Since the masquerader 32 may be remote from the source 30, network problems or congestion on the path from the source 30 to the destination 31 are avoided. The source 30 and the masquerader 32 are said to be in the rim since the masquerader 32 is willing to collaboratively masquerade for the source 30. The source host 30 may also be willing to masquerade for the masquerading host 32, that is, the rim host set may or may not act in a reciprocal manner. For simplicity, FIGS. 2 and 3 depict only a single masquerading and single source host, but the invention is not so limited. Any number of hosts may be implemented, and their roles may change dynamically.

For further illustration assume hosts A,B and C are connected via a network. A is the source, B is the destination and C is the masquerader. In order for 'C' to productively send part (or all) of the message, it must collaborate in some way with 'A' to be aware of which part or parts (on a packet level) of the message it should send. The division of the message into packets may be occurring dynamically (during transmission) in which case 'A' must inform 'C' how the message is divided or may be done in some a priori fashion (message division is predefined or otherwise known). Therefore, a decision process exists that dynamically controls the masquerading of one or more rim sets, each of which may be sending several messages at any time. In addition, the present invention supports both cases in that the masquerading hosts are either pre-informed about message division into packets, receive division information with the aid of the management object, or directly receive said packets for forwarding via masquerading.

In one embodiment of the present invention, the source of the original message and the destination are in the rim. In this case, in order for each masquerader to send packets (or an ensemble thereof) representing parts of the original, the original source must forward such packets to each masquerader to effect collaboration. In addition, the identity-verification information of the original source is sent with the forwarded packets. This action may occur using general network facilities or over dedicated resources of any type. One particular case of using a dedicated intra-Rim resource is shown in FIG. 3. The general depiction there is one in which this dedicated communication is congruous with the rest of the network, however any form of alternate communication resource may be used. Additionally, the use of such dedicated resources can be combined with the use of inter-network itself in various ways to form a parallel or partially parallel transmission.

In another embodiment, the source host (or other resource) "D" is outside the rim. The hosts in the rim still act in a masquerading fashion to improve delivery of the message to the destination. To effect collaboration, each masquerader may independently, or in some cooperative fashion, access the remote host "D" 38 to obtain the parts of the message they are responsible for sending. The original sending host may be either one of the masquerading rim set hosts or 'D' 38 itself, in which case, the rim hosts are effectively acting as a dynamically changing proxy for 'D' 38. In another form, a host external to the rim hosts, also 'D' 38, is accessed as needed by hosts in the rim to supply the message.

In a further embodiment, there are multiple copies of the message among hosts in the rim, for example, particular content may be distributed among rim servers via separate means on a periodic or other basis. In this case, data content does not need to be transmitted between the source 30 and masquerader 32 but only control information including source identity, ports and position in the message, etc. since masquerader 32 has its own copy of the message. So, it is not necessary to pass the message contents from the source 30 to the masquerader 32 who may use its own data source so long as the source 30 and the masquerader 32 collaborate to the extent that the masquerader 32 knows the point in the message that it is now responsible for. For example, a set of hosts may all have local (or otherwise available) copies of a set of video streams and the collaborative masquerading process only needs to (dynamically) assign hosts to sessions without concern for data content transmittal among the masquerading host set.

The present invention is general in that it applies to many types of networks, however, the Internet and its particular inter-networking operation can be considered individually given its prominence. The following applies to TCP and UDP operating over IP (the initial TCP specification is contained in Internet Request for Comments #793, Transmission Control Protocol, and for UDP—see Internet Request for Comments #768, User Datagram Protocol). For the Internet, host identification is generally done using Internet Protocol (IP) numbers (see Internet Request for Comments #791), Internet Protocol) and particular services or active connections at each host are offered in conjunction with a 'port.' Source and destination IP numbers along with source and destination ports are coded as integers (bit patterns contained in the packet). Incoming packets may be associated with particular messages or directed towards particular applications by examination of the destination IP and destination port as well as possibly the source IP and source port. Additional information which defines the amount of data and the position of the data within the context of the overall message may also be provided (e.g., sequence numbers for TCP) in the packet. Other information, for example TCP also provides acknowledgement information pertinent to data received, may also be contained within a packet.

Therefore, spoofing a receiver in the realm of the Internet requires that the masquerader have access to the sending host's IP identifier as well as source/destination port numbers, sequence and acknowledgment numbers in the case of TCP. It also needs to be aware of which portion of the message remains to be sent or which portion that it is responsible for sending. Continuing with the prior example in this Internet context, when it is determined that 'C' should masquerade for 'A', host 'C' (collaboratively) obtains 'A's IP identifier, and port and sequence/acknowledgement numbers that 'A' was using in its transmission with 'B'. 'C' uses this information, along with the original message contents coming from 'A' (or elsewhere, via a local copy) to spoof 'B' into accepting packets from itself. As mentioned, this collaboration takes many forms ranging to complete dynamic transmittal of the message via 'C' to merely informing 'C' of the location in the message for which it is assuming responsibility. From a receiver's perspective, as long as all of this information in consistent with some ongoing communication, the packet will be received as a valid part of the message.

Some networking communications, as is the case for some Internet protocols, are full-duplex in that packets flow in both directions even if data content flow is completely unidirectional; this requires that consideration be given to packets arriving from the receiver in association with a particular messaging or connection. The masquerading technique described herein is, in fact, compatible with this requirement. As described so far in the context of half-duplex connections, the invention does not alter reverse packet flow at all and hence is consistent with reverse packet flow requirements. This reverse flow may, for example, be a source of information regarding network availability and thereby aid in making masquerading decisions.

However, the system in accordance with the present invention may also provide support for alternative reverse flow requirements, as may be required at higher protocol levels or at the user application level. Returning to the example, even though 'C' is masquerading for 'A' in sending 'B' packets (i.e. the forward flow), reverse flow packets sent to 'A' from 'B' will still be directed towards 'A' by the network logic and routing. This is the desired situation as long as 'A' retains control of the higher protocol level or application level for this messaging connection (perhaps a 'TCP socket' in Internet terminology). However, should a decision be made that 'C' becomes the controller of this messaging connection, on either a permanent or a temporary basis, it may be necessary to have reverse flow packets be delivered to 'C'. Now, the forward path would be 'A' to 'C' to 'B' (or just 'C' to 'B' if 'C' had a local copy or alternate access to the message contents) and the reverse path 'B' to 'A' to 'C'. Since the network is directing reverse flow packets to 'A', this invention enables the last leg of this route (the 'A' to 'C' portion). Since 'A' is aware that 'C' is masquerading for it and it knows the destination's address and message identification, it can readily identify which incoming packets require this reverse service.

To summarize, this extra reverse service is not necessary if 'A' maintains logical control of the messaging, but it may be needed if 'C' takes some form of control of the messaging. However, in that case, 'A' can readily identify packets which require such service. In the event that 'A' and 'C' share control of the message in some way, then 'A' can use the packet information as well as forward it. In this way, the invention supports upper level protocol hand-offs (i.e. moving one end of a logical connection to another host in a manner unbeknownst to the other end). Thus, the invention specifically includes, but is not limited to, the additional actions in reverse flow packet routing as discussed herein. Note that in this case the communication socket was shifted from 'A' as source to 'C' as source with 'B' as the destination. However, due to the logical symmetry of the network, both sides of a single full-duplex connection or both sides of a pair of half-duplex connections may employ the invention to achieve a socket hand-off in both directions.

Without limitation, the reverse packet flow requirement can be understood in the context of the TCP Internet protocol. Using the case above, assume that a TCP connection exists between host 'A' and host 'B' and that host 'C' is to act as a masquerader for 'A' (at some time point). In one embodiment, the TCP level protocol is handed-off and remains between 'A' and 'C' even though 'A' is using 'C' to masquerade for it for forward packet delivery to 'B'. The reverse flow of TCP packets are directed to 'A' as part of normal network operation as desired. Now, if the TCP level connection is handed-off 'C' then 'A' is aware of this and forwards (and copies if needed) packets arriving in the context of this socket to 'C'. In this way, it appears to 'B' that the socket remains with 'A' even though 'C' has assumed a higher level of responsibility. Even though 'A' must now forward incoming packets to 'C' from 'B' in association with this connection, it is then freed from performing other higher level protocol actions or maintaining state in memory for the connection. In one embodiment, a new TCP instance on 'C' must be created in the acceptance of this socket hand-off; this may be accomplished using extra signaling within the IP layer or via separate means.

Packets of other types, for example ICMP packets (see *Internet Request For Comments #792, Internet Control Message Protocol*), may arrive at 'A' which are of interest to 'C' when it is masquerading for 'A' (irrespective of if it has also accepted a socket hand-off) or which are pertinent to the management and control of the rim. In these cases, 'A' makes use of the information contained in the packet as appropriate. As is evident, the invention may be used to enable capabilities that heretofore did not exist in higher level protocols and application levels which make use of packet-based messaging.

So far, the invention has been discussed in terms of point-to-point messaging, with a single source and destination. However it is equally applicable when the message being sent is a multicast (one to many hosts) or broadcast/anycast (one to any or all hosts). In these cases, the masquerading host assumes the same responsibilities that the previous source host had in a rather directly understood manner. If the original message was being sent as, for example, a multicast and a decision is made (via any of the methods described before) to use another Rim server for this messaging, than the masquerading host also sends the message as a multicast. The source would make use of the masquerading technique in the same way, and reverse flow packet services are handled similarly.

Another use of the invention's masquerading technique enables a mode called 'funnel-casting' which is a many to one communication style. Many networking technologies, as in the Internet, allow for correct reception of the message or stream even when duplicate packets or packets containing overlapping portions of the message are received. In such cases, the invention's masquerading technique can be used in another way, namely to simultaneously send packets containing duplicate or overlapping parts of the message from each masquerader, and possibly the original host as well. As discussed previously, the technique was used to provide an alternate location for packet sends into the network, but each packet was an independent portion of the overall message. In funnel-casting, however, packets with identical data content or containing overlapping portions of the message are sent from a multitude of hosts in the rim; if multiple identical packets are received the destination ignores the duplicates. Since packets are traveling along possibly different routes from each location in the Rim to their destination, this technique can also improve the destination's message reception. Reverse flow packets would be subject to the same consideration, namely that they would be returned by the network to the original source, which can act in a manner analogous to that before. In general but without limitation, this technique would be most useful when it does not cause additional congestion, for example in a network route on the last hops to the host.

Finally, the invention may also be used to improve 'load balancing' as well as improved packet delivery, as has been discussed thus far. Since the invention provides the ability to change servers that are sending messages, the invention provides an implementation method for balancing any number of aspects of loading in a dynamic manner. Such aspects include CPU utilization, disk space usage, memory usage, and consideration of server bandwidth utilization on an individual basis or using some aggregate characteristics of the Rim. The masquerading technique provides the means to allow virtually any algorithm or method to manage the goal(s) of load balancing. Furthermore, the goals of load balancing and improved packet services provided by the invention may be combined in a virtually limitless way. In this case, the goals of congestion avoidance and load balancing can be traded-off to the extent that they are not mutually consistent as might be guided by an algorithm or other mechanism.

What is claimed is:

1. A network, comprising
a plurality of hosts constructed and arranged for the transfer of digital information between the hosts, the plurality of hosts including
a first host acting as a source host;
a second host acting as a destination host;
a third host acting as a collaborating host; and,
a management object constructed and arranged to facilitate collaboration between the source host and the collaborating host in transferring data between the source host and the destination host, the management object monitoring network status to determine if a need exists based on one of network congestion, load balancing, transfer latency and effective bandwidth, wherein:
if the need exists, the management object instructs the source host to provides necessary control information and message contents to the collaborating host, and the collaborating host sends the data to the destination host in such a way as to make the destination host believe the data is from the source host; and
if the need does not exist, the management object does not instruct the source host to provide said necessary control information and message contents to the collaborating host, and the source host sends the data to the destination host.

2. The network of claim 1 wherein a series of collaborating hosts are used in delivery of particular packets.

3. The network of claim 1 wherein the collaborating hosts are simple hardware elements.

4. The network of claim 1 wherein the management object is executable to facilitate collaboration by forwarding the data, with identity information of the source host, to the collaborating host.

5. The network of claim 1 wherein the management object is executable to facilitate collaboration by causing the collaborating host to access the source host and obtain the data and identity-verification information of the source.

6. The network of claim 5 wherein the rim of hosts is fixed.

7. The network of claim 5 wherein the rim of hosts is dynamic and changes at the direction of the management object.

8. The network of claim 1 wherein the management object is executable to facilitate collaboration by making multiple copies of the data available so that the collaborating host has an available copy of the data.

9. The network of claim 1 wherein a plurality of collaborating host are provided and the plurality of collaborating host form a rim of hosts.

10. The network of claim 9 wherein the dynamic rim of hosts changes as a function of the network information.

11. The network of claim 1 further comprising dedicated network resources for communication between the source host and the collaborating host.

12. The network of claim 11 wherein the packet is encapsulated by the source host for transmission to the collaborating host, and the collaborating host performs de-packaging of the packet for transmission to the destination host.

13. The network of claim 11 wherein the destination host identifies incoming packets by the source identifying information.

14. The network of claim 1 further comprising dedicated network resources for communication between the collaborating host and the destination host.

15. The network of claim 12 wherein the source identifying information is maintained when the collaborating host sends the data to the destination host so that when the destination host reads the source identifying information, the source identifying information informs the destination host that the source host sent the data.

16. The network of claim 1 wherein the data is transmitted in packet form wherein a packet contains source identifying information.

17. The network of claim 1 wherein the load balancing further comprises balancing CPU usage.

18. The network of claim 1 wherein the load balancing further comprises balancing memory usage.

19. The network of claim 1 wherein the load balancing further comprises balancing disk space usage.

20. The network of claim 1 wherein the load balancing further comprises balancing host bandwidth.

21. The network of claim 1 wherein the load balancing further comprises balancing server loading.

22. The network of claim 1 wherein the management object uses network resources for computation and communication.

23. The network of claim 1 wherein the management object resides on an outside controller.

24. The network of claim 1 wherein the management object is divided into a plurality of objects, each of the objects residing on separate nodes on the network and acting cooperatively to manage and control the collaborating host in transferring data between the source host and the destination host.

25. The network of claim 1 wherein the management object monitors network status by monitoring network information, said network information including ICMP error packets.

26. The network of claim 1 wherein the management object monitors network status by monitoring network information, said network information including a reverse flow of packet loss information.

27. The network of claim 1 wherein the management object monitors network status by monitoring network information, said network information including traffic congestion information.

28. The network of claim 1 wherein the management object monitors network status by monitoring network information, said network information including message buffer status indicators from the destination host.

29. The network of claim 1 wherein the network uses a multicast messaging system.

30. The network of claim 1 wherein the network uses an anycast messaging system.

31. The network of claim 1 wherein the network uses a broadcast messaging system.

32. The network of claim 1 wherein the collaborating hosts each have access to a copy of the data intended for the destination host.

33. The network of claim 1 wherein the management object provides all signaling and control at a packet layer.

34. The network of claim 1 further comprising server extensions.

35. The network of claim 34 wherein the transfer of digital information between host is implemented via Internet TCP socket hand-off among the hosts.

36. The system of claim 35 wherein upper level communication is via TCP, and wherein collaboration between source host and collaborating host includes exchange of sequence and acknowledgment information.

37. The network of claim 35 wherein the management object is executable to facilitate collaboration by obtaining:
    an IP identifier of the source host;
    a port identification of the source host; and,
    the data of the source host.

38. The network of claim 1 further comprising dedicated ports.

39. The network of claim 1 wherein the source host lies outside the network.

40. The network of claim 1 wherein upper protocol level hand-off is supported by the packet level mechanisms.

41. The network of claim 40 wherein the network is the Internet and wherein the source identification information further comprises:
    an IP identifier; and,
    a port identification.

42. The network of claim 1 wherein the collaboration further comprises obtaining source identification information from the source host.

43. The network of claim 1 wherein the management object is divided into a plurality of objects, each of the objects residing on separate nodes on the Internet and acting cooperatively to manage and control the hosts in transferring data between the source host and the destination host.

44. The network of claim 1 further comprising dedicated network resources for communication between the source host and the collaborating hosts.

45. The network of claim 1 further comprising dedicated network resources for communication between the collaborating hosts and the destination host.

46. The network of claim 1 wherein the collaborating hosts each have access to a copy of the data to be sent to the destination host.

47. The network of claim 1 wherein the management object resides on the source host.

48. The network of claim 1 wherein the management object resides on the collaborating host.

49. The network of claim 1 wherein the management object provides all signaling and control at a packet layer.

50. A method of communicating over a network comprising the steps of:
    obtaining network information;
    determining from the network information if a need exists based on one of network congestion, load balancing, transfer latency, and effective bandwidth;
    if the need exists:
        sending data intended for a destination host, from a source host to a host acting as a collaborating host;
        facilitating collaboration between the source host and the collaborating host;
        sending the data to the destination host from the collaborating host so that the destination host believes the data came from the source host; and if the need does not exist:
        sending data intended for a destination host, from the source host to the destination host without sending said data to any host acting as a collaborating host.

51. The method of claim 50 further comprising the step of providing a rim of hosts.

52. The method of claim 51 further comprising the step of maintaining the rim of hosts as a fixed set.

53. The method of claim 52 further comprising the step of dynamically changing the rim of hosts as a function of the network information.

54. The method of claim 50 wherein the load balancing is server load balancing.

55. The method of claim 50 wherein the load balancing is CPU load balancing.

56. The method of claim 50 wherein the load balancing is balancing memory usage.

57. The method of claim 50 wherein the load balancing is balancing disk space usage.

58. The method of claim 50 wherein the load balancing is host bandwidth load balancing.

59. The method of claim 50 wherein the step of obtaining network information further comprises obtaining ICMP error packets.

60. The method of claim 50 wherein the step of obtaining network information further comprises obtaining congestion information.

61. The method of claim 50 wherein the step of obtaining network information further comprises obtaining a reverse flow of packet loss.

62. The method of claim 50 wherein the step of obtaining network information further comprises obtaining message buffer status indicators from the destination host.

63. The method of claim 50 herein the step of sending data from a source host to a collaborating host further comprises the step of sending the data from the source host to the collaborating host along a dedicated network resource.

64. The method of claim 50 wherein the step of sending data to a destination host from the collaborating host further comprises the step of sending the data from the source host to the collaborating host along a dedicated network resource.

65. The method of claim 50 further comprising the step of storing a copy of the data on the collaborating host.

66. The method of claim 50 further comprising the step of controlling the collaborating host and the source host at a packet layer.

67. The method of claim 50 wherein the step of facilitating collaboration between the source host and the collaborating host further comprises obtaining source identification information from the source host by obtaining:
- an IP identifier of the source host;
- a datagram number of the source host;
- a port identification of the source host; and,
- the data of the source host.

68. The method of claim 50 wherein the step of facilitating collaboration between the source host and the collaborating host further comprises forwarding the data, with identity-verification information of the source host, to the collaborating host.

69. The method of claim 50 wherein the step of facilitating collaboration between the source host and the collaborating host further comprises causing the collaborating host to access the source host and obtain the data and identity-verification information of the source.

70. The method of claim 50 wherein the step of facilitating collaboration between the source host and the collaborating host further comprises making multiple copies of the data available so that the collaborating host has an available copy of the data.

* * * * *